United States Patent
Kim et al.

[19]

[11] Patent Number: 5,963,254
[45] Date of Patent: Oct. 5, 1999

[54] TECHNIQUE FOR BACKLIGHT COMPENSATION BY SELECTING MOST APPROPRIATE COMPENSATION AREA AND CONTROLLING IRIS IN ACCORDANCE WITH LUMINANCE LEVEL THEREOF

[75] Inventors: Joon-kyu Kim, Suwon; Ki-young Choi, Kyungki-do, both of Rep. of Korea

[73] Assignee: SamSung Electronics Co., Ltd., Kyungki-do, Rep. of Korea

[21] Appl. No.: 08/695,426

[22] Filed: Aug. 12, 1996

[30] Foreign Application Priority Data

Aug. 12, 1995 [KR] Rep. of Korea ............. 95-24894

[51] Int. Cl.$^6$ ............................. H04N 5/238
[52] U.S. Cl. ............................. 348/363; 348/365
[58] Field of Search ............. 348/362, 363, 348/364, 365, 350, 169, 370

[56] References Cited

U.S. PATENT DOCUMENTS

| | | | |
|---|---|---|---|
| 5,049,997 | 9/1991 | Arai | 348/364 |
| 5,184,172 | 2/1993 | Miyazaki | 348/362 |
| 5,343,246 | 8/1994 | Arai et al. | 348/363 |
| 5,349,415 | 9/1994 | Nishida | 348/364 |
| 5,638,123 | 6/1997 | Yamaguchi | 348/364 |
| 5,677,733 | 10/1997 | Yoshimura et al. | 348/362 |

*Primary Examiner*—Wendy Garber
*Assistant Examiner*—Alicia M. Harrington
*Attorney, Agent, or Firm*—Robert E. Bushnell, Esq.

[57] ABSTRACT

A technique for backlight compensation in a monitoring camera performs automatic backlight compensation without any need for manually redesignating a backlight compensation area, despite changes in ambient illumination, by selecting the most appropriate backlight compensation area for changes in the ambient illumination and the movement of an object from among a plurality of predetermined backlight compensation areas and controlling an iris on the basis of the luminance signal level of the selected backlight compensation area, to thereby control the luminance signal level. A backlight compensation is performed by adjusting the positions and sizes of backlight compensation areas so as to be suitable to the surroundings of the monitoring camera by a user, and automatically or manually selecting the most appropriate backlight compensation area in accordance with changes in illumination and changes in the position of the object, and controlling the iris according to the luminance signal level of the selected backlight compensation area.

29 Claims, 9 Drawing Sheets

TECHNIQUE FOR BACKLIGHT COMPENSATION BY SELECTING MOST APPROPRIATE COMPENSATION AREA AND CONTROLLING IRIS IN ACCORDANCE WITH LUMINANCE LEVEL THEREOF

CROSS REFERENCE TO RELATED APPLICATIONS

This application make reference to and claims all benefits accruing under 35 U.S.C §119 from an application entitled BACKLIGHT COMPENSATION METHOD AND APPARATUS THEREFOR earlier filed in the Korean Industrial Property Office on Aug. 12, 1995 and assigned Ser. No. 24894/1995.

BACKGROUND OF THE INVENTION

The present invention relates to a method and apparatus for providing backlight compensation and, more particularly, to a method and apparatus for backlight compensation for minimizing the interference of the surroundings of a monitoring camera and ambient illumination while photographing an object with the monitoring camera.

When photographing an object in a normal mode with a monitoring camera installed in a predetermined place with a surrounding illumination condition such as the sun, an incandescent light, or the headlights of cars at night, the object is placed in a backlight illumination state and thus a shaded and blurred image is obtained.

That is, when photographing the object without setting a backlight compensation mode, i.e. in a normal mode, the light intensity is controlled by closing down an iris in accordance with the luminance signal level of an illuminant, which is incident through the iris without any allowance for the luminance signal level of the object, thereby producing the shaded and blurred image of the object on a screen. To circumvent the problem, a monitoring camera has a backlight compensation (backlight compensation) function. The backlight compensation function serves to obtain a desired clarity by reducing the influence of the illumination on an object and any other interference for the purpose of ensuring a desired image quality of the object.

In a conventional backlight compensation apparatus, the user manually selects a backlight compensation area from among a predetermined number of backlight compensation areas (e.g. fire backlight compensation areas). The user manually selects the most appropriate backlight compensation area for the surroundings and an ambient illumination of the monitoring camera by operating one of a plurality of selecting keys, each with selecting key corresponding to a fixed backlight compensation area. Precise backlight compensation area selection is difficult since the selection appropriate for the various surroundings of a monitoring camera relies on a user's judgement.

Moreover, even when an appropriate selection of one backlight compensation area is made in connection with an ambient illumination, the backlight compensation area must be redesignated whenever the ambient illumination conditions change. Otherwise, the backlight compensation function of the monitoring camera may be lost or may not work satisfactorily.

Accordingly, in the convention backlight compensation function, it is inconvenient to redesignate backlight compensation areas whenever a object moves or illumination conditions or watch angles change. Furthermore, when photographing an object in an outdoor setting, the backlight compensation areas must be continually redesignated due to changes in the natural light caused by the passage of time. Failure to do so will result in a deterioration of the clarity of the photographed object.

SUMMARY OF THE INVENTION

It is an object of the present invention to provide an improved process and apparatus for providing backlight compensation.

It is another object to provide a backlight compensation method for automatically selecting a backlight compensation area in accordance with changes in the illumination and the position of the object, when photographing the object.

It is yet another object to provide a backlight compensation method for backlight compensating by either automatically or manually selecting the most appropriate of backlight compensation areas adjusted by a user.

It is still another object to provide a backlight compensation method for backlight compensating by accommodating either automatic or manual selection of the most appropriate of predetermined backlight compensation areas or adjusted backlight compensation areas.

It is a further object to provide a backlight compensation apparatus for performing the above backlight compensation methods.

According to one characteristic of the invention, when photographing an object with a monitoring camera, the interference of the natural light and ambient illumination is avoided to obtain the desired clarity of the object. The position of the object is automatically sensed, regardless of the movement of the object or changes in the illumination, the most appropriate of a plurality of predetermined backlight compensation areas is automatically selected in response to changes in the illumination, to provide backlight compensation, and the selected backlight compensation area is automatically displayed as an on screen display.

According to another characteristic of the invention, the sizes and positions of backlight compensation areas are adjusted, the adjusted backlight compensation areas are stored, the most appropriate of the adjusted backlight compensation areas is either automatically or manually selected, to provide backlight compensation, and the selected backlight compensation area is automatically displayed as an on screen display.

According to still another characteristic of the invention, the most appropriate backlight compensation area for changes in the illumination and the position of an object is either selected automatically or manually among predetermined backlight compensation areas and adjusted backlight compensation areas, to obtain backlight compensation and the selected backlight compensation area is displayed as an on screen display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
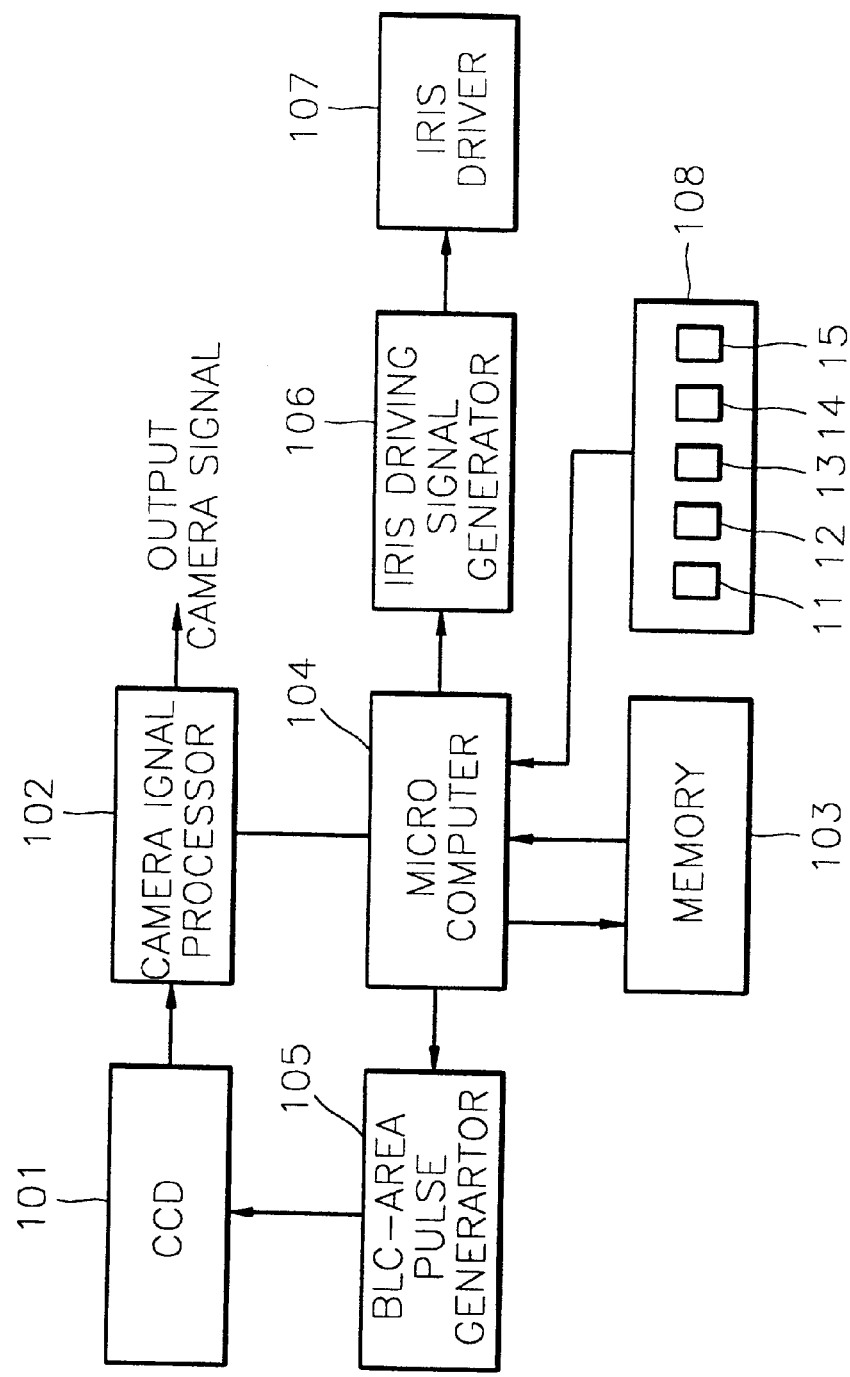
FIG. 1 is a block diagram of a hypothetical representation of a conventional backlight compensation apparatus in a typical monitoring camera.

Turning now to the drawings, FIG. 1 illustrates a conventional backlight compensation apparatus of a monitoring camera. This type of backlight compensation apparatus is often constructed with a charge coupled device (hereinafter, referred to as CCD) 101 including registers driven by driving pulses and corresponding to displays thereof for converting optical information of an object into an electrical signal, a camera signal processor 102 for converting the electrical signal into a luminance signal and a camera signal, a memory 103 for storing the positional information of a predetermined number of backlight compensation areas (in this case, five backlight compensation areas) and the reference luminance signal levels of the corresponding backlight compensation areas, a microcomputer 104 for reading out the positional information and the value of the reference luminance signal level of a backlight compensation area selected by one of backlight compensation-area selecting keys 11–15 included in a key-input unit 108, outputting an area control signal corresponding to the positional information, and outputting an iris control signal according to the level of the luminance signal of the selected backlight compensation area which is output from camera signal processor 102, a backlight compensation-area pulse generator 105 for outputting a backlight compensation-area pulse (so-called, charge-removing pulse) to CCD 101 to store the charge of the backlight compensation area corresponding to the area control signal output from microcomputer 104, an iris driving signal generator 106 for generating an iris driving signal in accordance with the iris control signal, and an iris driver 107 for controlling light intensity by controlling the opening of the iris in accordance with the iris driving signal.

The conventional backlight compensation apparatus of the monitoring camera as constituted above is provided with a predetermined number of separated backlight compensation areas according to the model of the monitoring camera in a manufacturing process. In the model shown in FIG. 2, for example, the five backlight compensation areas of A, B, C, D and E, are illustrated. Accordingly, when installing the monitoring camera, it is necessary to manually select the most appropriate backlight compensation area for the surroundings and the ambient illumination of the monitoring camera by using backlight compensation-area selecting keys 11–15 corresponding to the five respective backlight compensation areas in key-input unit 108. In this case, precise backlight compensation-area selection is difficult since the selection of backlight compensation areas appropriate for various surroundings of a monitoring camera relies heavily upon user judgement.

Moreover, despite an appropriate selection of one backlight compensation area in connection with the ambient illumination by a user, if the selection is not suitable to the surroundings of the monitoring camera, the user should redesignate another appropriate backlight compensation area with backlight compensation-area selecting keys 11–15 whenever ambient illumination conditions change. Otherwise, the backlight compensation function of the monitoring camera may be lost or may not work satisfactorily. As a result, in the conventional backlight compensation function, it is inconvenient to redesignate backlight compensation modes whenever an object moves or illumination conditions and watching angles change. Another problem in conventional practice occurs when photographing an object in an outdoor setting, backlight compensation areas must be continuously redesignated in relation to changes in the natural light caused by the passage of time and, otherwise, the image clarity of the object deteriorates.

Figure 2:
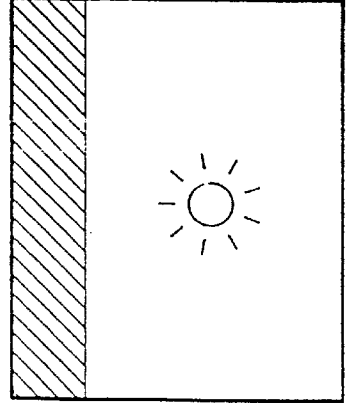
FIG. 2 illustrates an example of a display divided into five backlight compensation areas.
Figure 3:
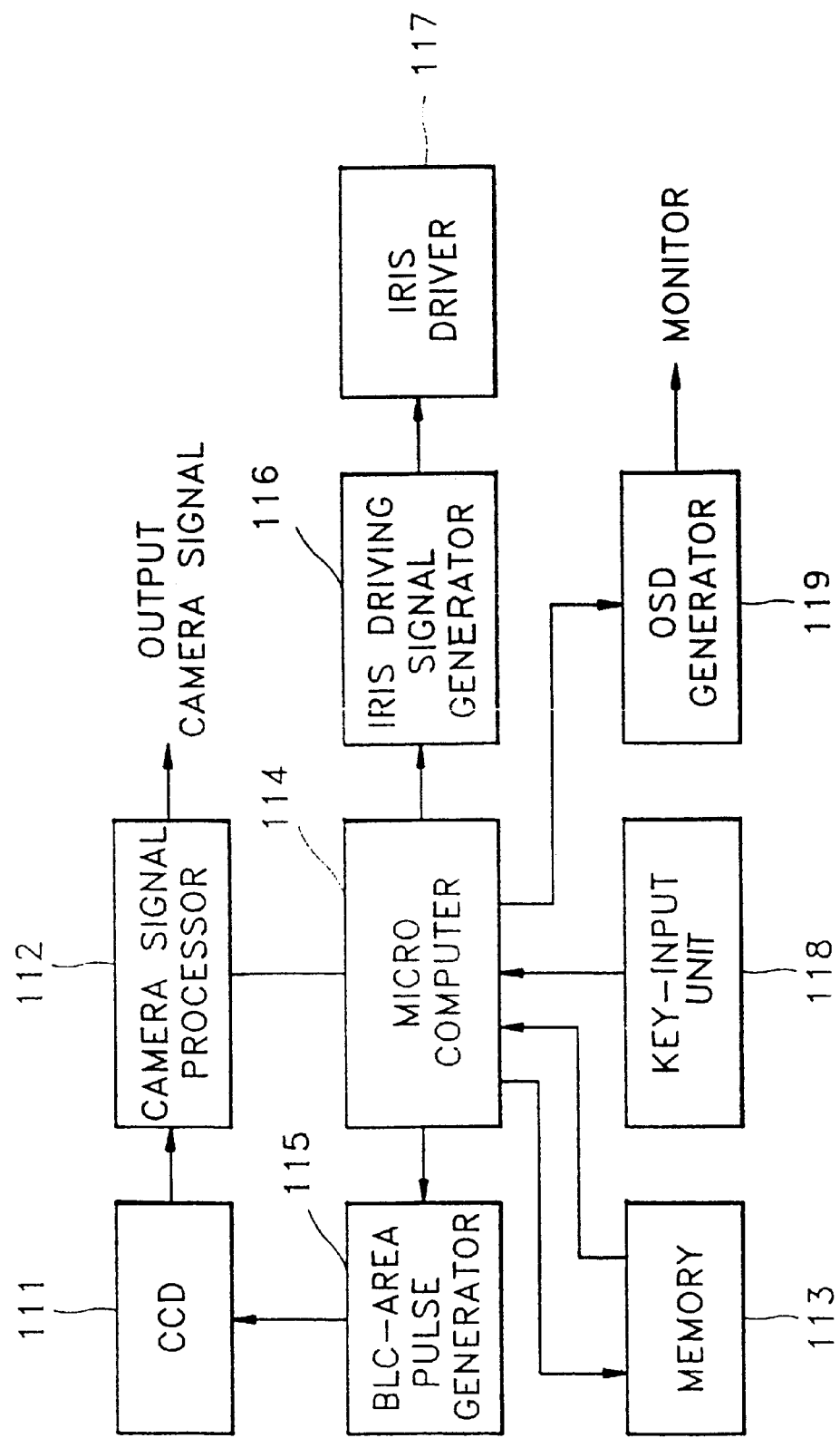
FIG. 3 is a block diagram of a backlight compensation apparatus for performing an embodiment of a backlight compensation method according to the principles of the present invention.

FIG. 3 is a block diagram of the backlight compensation apparatus of a monitoring camera for the practice of backlight compensation according to the principles of the present invention. A description of the same elements as those of FIG. 1 has been omitted for brevity. The backlight compensation apparatus of FIG. 3 is different from that of FIG. 1 in that the former has a key-input unit 118 including a single automatic backlight compensation mode designation key, substituting for the key-input unit 108 including backlight compensation-area selecting keys 11–15 for manually selecting five backlight compensation areas, and an OSD generator 119 for generating an OSD corresponding to a selected backlight compensation area. Here, key-input unit 118 may be provided on the monitoring camera or may be a remote-controller unit, Referring again to FIG. 3, after driving the monitoring camera, an automatic backlight compensation mode is designated by inputting the automatic backlight compensation mode designation key in key-input unit 118. A microcomputer 114 recognizes the automatic backlight compensation mode designation key input and outputs area control signals corresponding to five predetermined backlight compensation areas to a backlight compensation-area pulse generator 115. The backlight compensation-area pulse generator 115 outputs charge-removing pulses corresponding to the five predetermined backlight compensation areas. As shown in FIG. 2, for example, with respect to an area having an object (hereinafter, referred to as "object area") A and an area having an illuminant hereinafter, referred to as "illumination area"), a charge-removing pulse is generated so that charges are stored in the registers of CCD 111 corresponding to object area A and charges are not stored in the registers of CCD 111 corresponding to the illumination area. No object is shown in FIG. 2 for clarity.

The charge-removing pulse includes a horizontal removing pulse of a horizontal frequency cycle and a vertical removing pulse of a vertical frequency cycle. A signal picked-up in CCD 111 driven by the charge-removing pulse is output as a luminance signal Y of a corresponding backlight compensation area through camera signal processor 112. Microcomputer 114 calculates the difference value between the luminance signal levels of each backlight compensation area from camera signal processor 112 and its reference luminance signal level stored in memory 113, selects a backlight compensation area having the least difference value, and outputs an iris control signal so as to maintain the luminance signal level of the object area for the selected backlight compensation area constant. An iris driving signal generator 116 generates an iris driving signal in accordance with the iris control signal output from microcomputer 114, and an iris driver 117 controls the opening of the iris in accordance with the iris driving signal.

Here, the luminance signal level of the object area of the selected backlight compensation area is maintained constant by controlling a driving signal for driving CCD 111 under the control of microcomputer 114, not by controlling the luminance signal level with the iris. This is referred to as an electric level control (ELC). The monitoring camera generally includes a CCD driver, though not shown, for outputting the driving signal for driving CCD 111. OSD generator 119 displays the backlight compensation area selected under the control of microcomputer 114 as an OSI) on a screen, to thereby let a user know the position of the object easily. The screen may be that of the monitoring camera or that of a monitor for displaying camera output.

Figure 4:
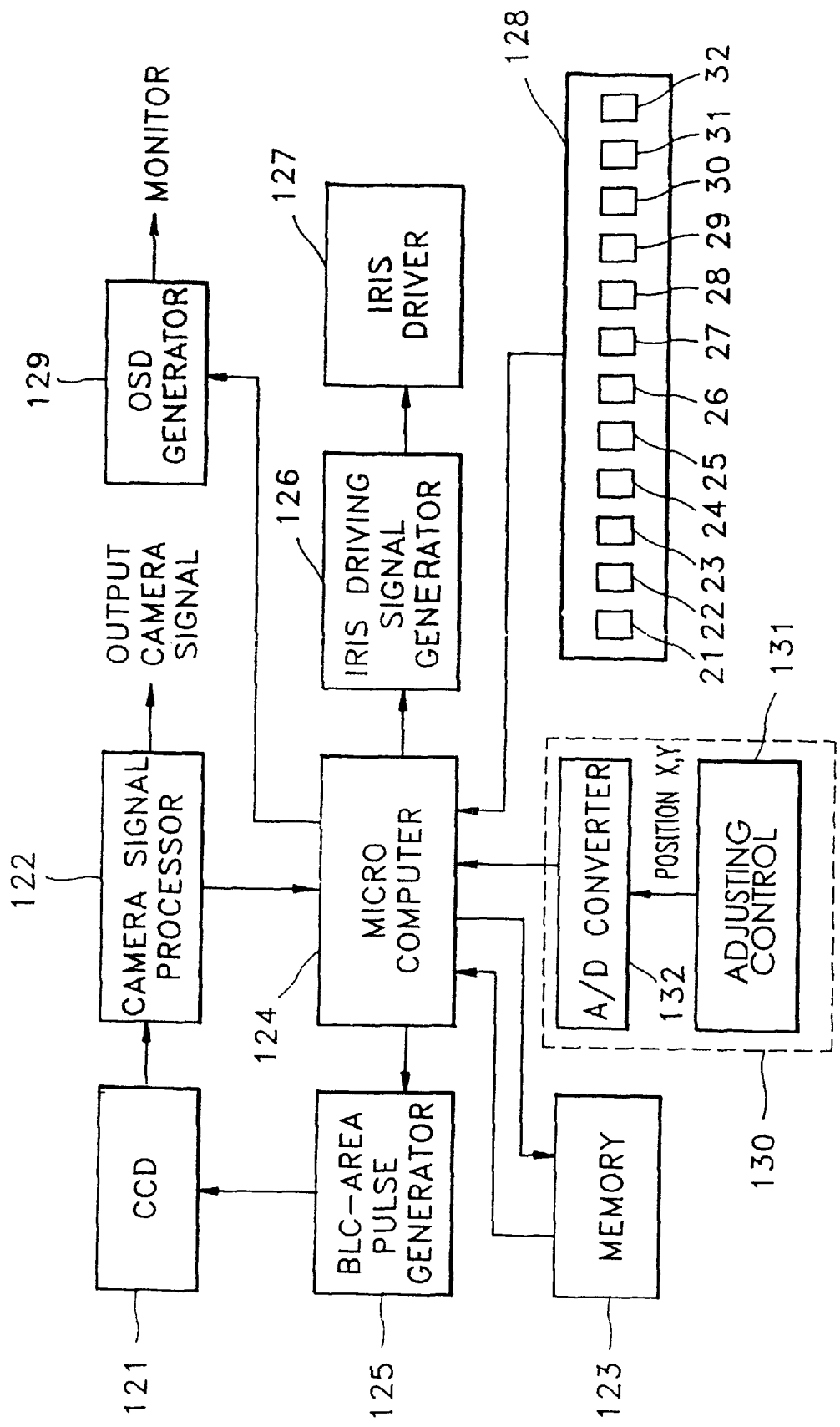
FIG. 4 is a block diagram of a backlight compensation apparatus for performing another embodiment of the backlight compensation method according to the principles of the present invention.

FIG. 4 is a block diagram of a backlight compensation apparatus for performing another embodiment of the backlight compensation method according to the present invention. A description of the same elements as those of FIG. 3 has been omitted for brevity. The structure of the apparatus of FIG. 4 is different from that of the apparatus shown in FIG. 3 in that the former additionally has a backlight compensation-area adjusting portion 130 including a backlight compensation adjusting control 131 for adjusting the position of a backlight compensation area on a screen and the X- and Y-axis directional sizes thereof and an analog-digital converter (A/D converter) 132 for converting the analog output of the backlight compensation adjusting control 131 into a digital signal which the microcomputer 114 can recognize.

The automatic backlight compensation mode designation key provided in key-input unit 118 in FIG. 3 is replaced by a key-input unit 128 constructed with a backlight compensation adjustment starting key 21 for inputting an instruction for adjusting a backlight compensation area, a backlight compensation adjustment stopping key 22 for inputting an instruction for stopping the adjustment of the backlight compensation area, a backlight compensation-area storing key 23 for inputting an instruction for storing the data of the size and position of the adjusted backlight compensation area, an enter key 24 for designating the respective data of the position, X-axis directional size and Y-axis directional size of the backlight compensation area which are sequentially adjusted by the backlight compensation adjusting control 131, a backlight compensation mode key 25 for designating a backlight compensation mode, a backlight compensation automatic/manual mode key 26 for designating whether the backlight compensation mode is automatically or manually selected, a menu key 27 for selecting predetermined backlight compensation areas or adjusted backlight compensation areas, both being stored in memory 123, and backlight compensation-area selecting keys 28–32 for enabling a user to manually select the backlight compensation areas stored in memory 123. Here, the adjusting control 131 may be built in key-input unit 128.

Referring now to FIG. 4, when the backlight compensation mode key 25 is in an electrical "on" state, microcomputer 124 recognizes the "on" state, and determines whether to adjust a backlight compensation area according to the "on" or "off" state of the backlight compensation adjustment starting key 21 in the backlight compensation mode of the monitoring camera.

When the backlight compensation adjustment starting key 21 is in its "on" position, the position of an object illuminated by backlight with respect to an illuminant on a screen is selected by controlling the backlight compensation adjusting control 131, and then the position is designated on the screen by operating the enter key 24. At this time, an OSD generator 129 generates an OSD corresponding to the adjusted position of the backlight compensation area on the screen to help the user adjust the backlight compensation area easily.

The designation of the X-axis size of the backlight compensation area is made by controlling the backlight compensation adjusting control 131 at the adjusted position of the backlight compensation area and operating the enter key 24. Thereafter, the designation of the Y-axis size of the backlight compensation area may be made by controlling the backlight compensation adjusting control 131 at the adjusted position of the backlight compensation area and operating the enter key 24.

The analog signal of the position, and X- and Y-axis sizes of the backlight compensation area adjusted by the backlight compensation adjusting control 131 is converted into a digital signal in the A/D converter 132 and the digital signal is input to the microcomputer 124. Then, the OSD generator 129 displays the adjusted backlight compensation area as an OSD under the control of the microcomputer 124.

When backlight compensation-area storing key 23 is "on", the microcomputer 124 stores the data of the position and X- and Y-axis sizes of the adjusted backlight compensation area in memory 123. A backlight compensation-area pulse generator 125 generates a charge-removing pulse corresponding to the adjusted backlight compensation area, so that the luminance signal Y of the adjusted backlight compensation area is read out from a CCD 121 in the camera signal processor 122.

Microcomputer 124 compares the level of the luminance signal Y of the adjusted backlight compensation area which is read out in the camera signal processor 122 with the reference luminance signal level, and the difference value is stored in the memory 123.

Here, the user designates different backlight compensation areas suited for illumination conditions expected in the surroundings of the monitoring camera by moving the X and Y axes on the screen, by repeating the procedure performed by the backlight compensation-area adjusting control 130, until the backlight compensation adjustment stopping key 22 is "on". When the backlight compensation adjustment stopping key 22 is "on", the microcomputer 124 determines whether backlight compensation automatic/manual mode key 26 is in either of its on or off operational position.

The memory 123 is constructed with a first data area in which the data of the positions, reference luminance signal levels, and difference values between the current luminance signal levels and the reference luminance signal levels, of the five predetermined backlight compensation areas are stored, and a second data area in which the data of the positions, the reference luminance signal levels, and difference values between the current luminance signal levels and the reference luminance signal levels, of the backlight compensation areas adjusted by the user are stored.

When a backlight compensation automatic mode is selected by the backlight compensation automatic/manual mode key 26, the microcomputer 124 selects a backlight compensation area having the object from among the predetermined backlight compensation areas or the previously adjusted backlight compensation areas according to the menu key 27. That is, the microcomputer 124 reads the difference values from the first or second data area of the memory 123 where the difference values between the levels of the luminance signals Y read out from the camera signal processor 122 and the reference luminance signal levels are stored, and selects a backlight compensation area having the least difference value. At this time, the OSD generator 129 generates an OSD corresponding to the selected backlight compensation area under the control of the microcomputer 124.

After selecting the backlight compensation area having the least difference value, the microcomputer 124 generates an iris control signal to an iris driving signal generator 126, in response to the data of the luminance signal level, which is read out from the CCD 121, of the selected backlight compensation area.

The iris driving signal generator 126 generates an iris driving signal which is input to an iris driver 127 according to the iris control signal output from the microcomputer 124, to thereby backlight compensate.

Accordingly, with the automatic backlight compensation mode designated, the microcomputer 124 automatically selects the most appropriate backlight compensation area suited to the present illumination condition from among the backlight compensation areas designated to be appropriate for expected illumination conditions by the user or the predetermined backlight compensation areas, and controls the iris according to the luminance signal level of the selected backlight compensation area, thereby obtaining a distinct image of the object, even though it is illuminated by backlight.

Meanwhile, when the backlight compensation manual mode is selected, one of the predetermined backlight compensation areas or adjusted backlight compensation areas is selected according to the operation of the menu key 27 and the five backlight compensation manual keys 28–32. Thus, the iris driving signal is generated by the iris driving signal generator 126 in response to the luminance signal level, which is read out from CCD 121, of the selected backlight compensation area, and the iris driver 127 is driven by the generated iris driving signal, thereby backlight compensating.

The backlight compensation apparatus shown in FIG. 4 can permit a user to adjust backlight compensation areas and display the adjusted backlight compensation areas as OSDs. The adjusted backlight compensation areas are stored in the manual mode. In the manual mode, one of the adjusted backlight compensation areas or predetermined backlight compensation areas is selected, while in the automatic mode the most appropriate backlight compensation area for the change of the object position and the change of illumination conditions is automatically selected from among the backlight compensation areas adjusted by the user or from among the predetermined backlight compensation areas.

Figure 6A:
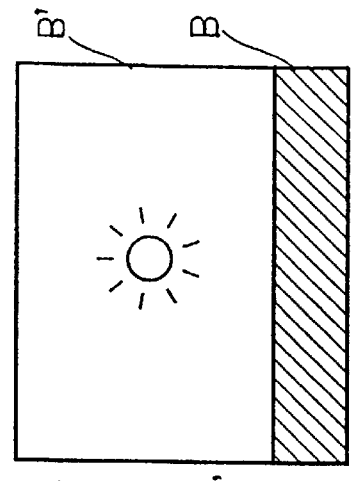
FIGS. 6A through 6E illustrate an example of each of the several divided backlight compensation areas represented in FIG. 2.
Figure 5A:
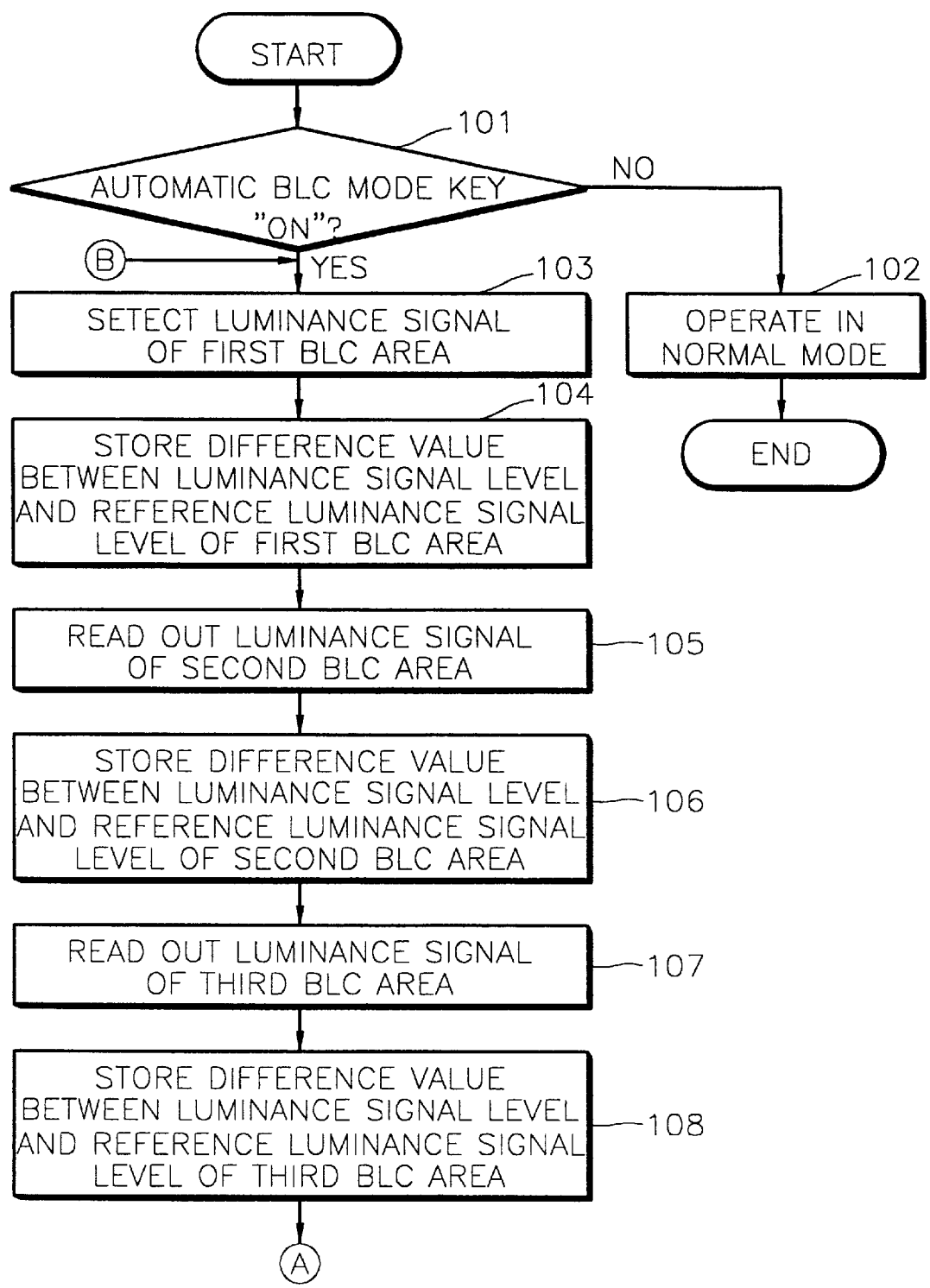
FIG. 5 is a flowchart illustrating the operation of an embodiment of the backlight compensation performed method according to the principles of the present invention.
Figure 5B:
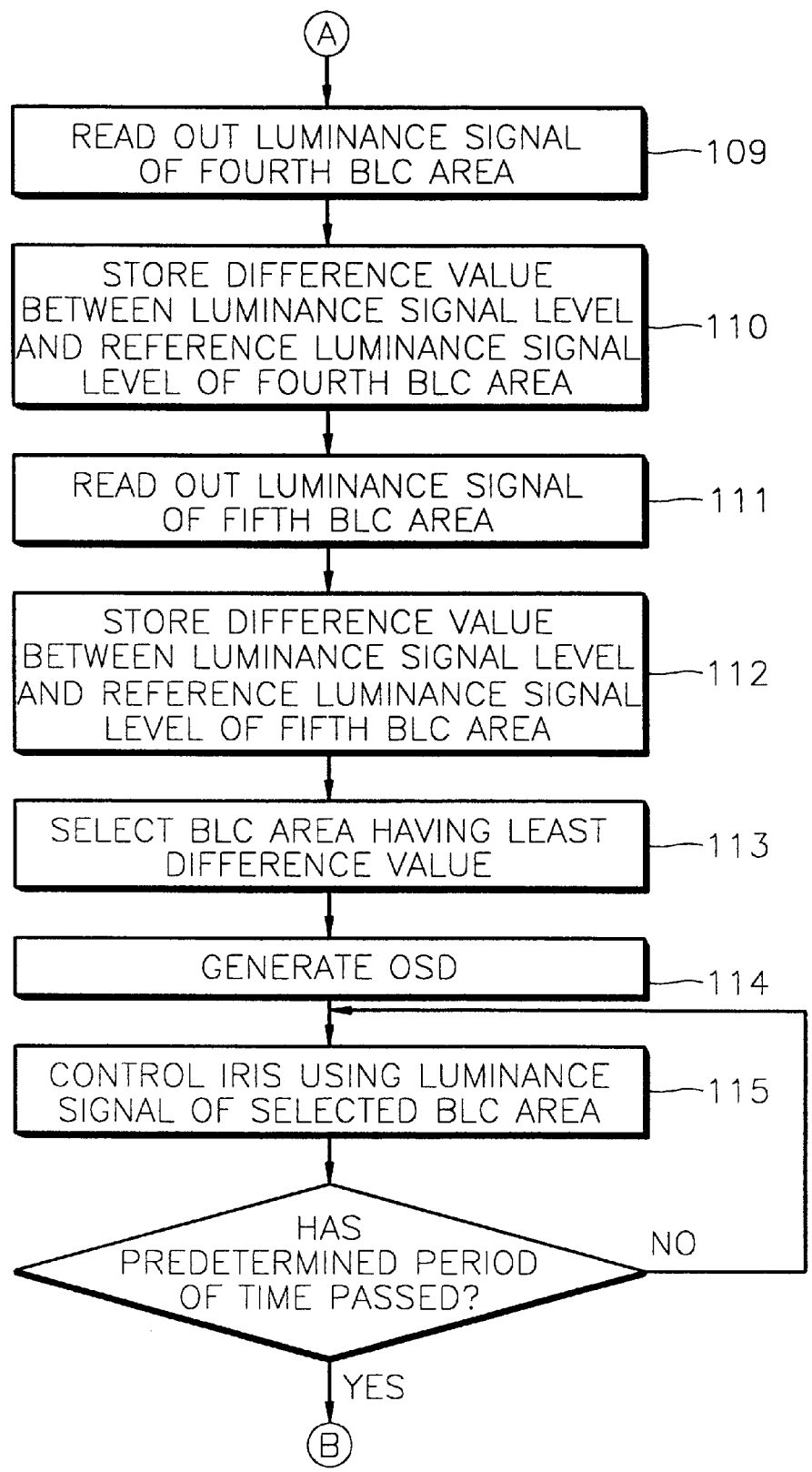

FIG. 5 is a flowchart illustrating the operation of an embodiment of a backlight compensation method according to the present invention. The method will be described referring to FIG. 3, FIG. 5 and FIGS. 6A through 6E. In step 101, it is determined whether the automatic backlight compensation mode designation key of key-input unit 118 is "on" or "off". When the backlight compensation mode designation key is "off", the monitoring camera operates in a normal mode, not in a backlight compensation mode, in step 102. When the backlight compensation mode designation key is "on", a backlight compensation-area pulse corresponding to a first backlight compensation area having an object area A and an illumination area A' as shown in FIG. 6A, and the backlight compensation-area pulse is output to CCD 111, in step 103.

Figure 6B:
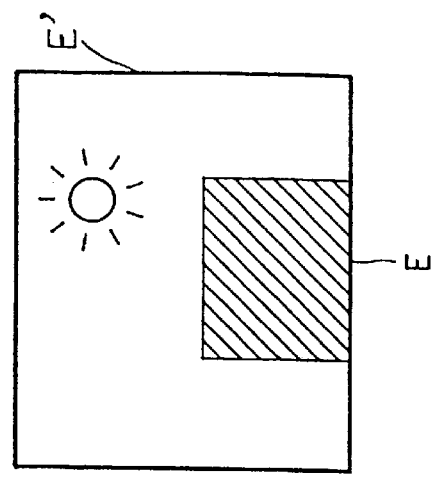

A luminance signal corresponding to object area A is read out from camera signal processor 112 through CCD 111 according to the backlight compensation-area pulse. In step 104, the value of the read-out luminance signal level of the first backlight compensation area is compared with a predetermined reference luminance signal level and the difference value is stored in memory 113. In step 105, as shown in FIG. 6B, a second backlight compensation area having an object area B and an illumination area B' is selected, and the level of the luminance signal of the second backlight compensation area is read out from CCD 111. In step 106, the value of the luminance signal level of the second backlight compensation area is compared with the reference luminance signal level value and the difference is stored in memory 113. In step 107, as shown in FIG. 6C, a third backlight compensation area having an object area C and an illumination area C' is selected, and the level of the luminance signal of the third backlight compensation area is read out from CCD 111. In step 108, the value of the luminance signal level of the third backlight compensation area is compared with the reference luminance signal level value and the difference value is stored in memory 113.

Figure 6D:
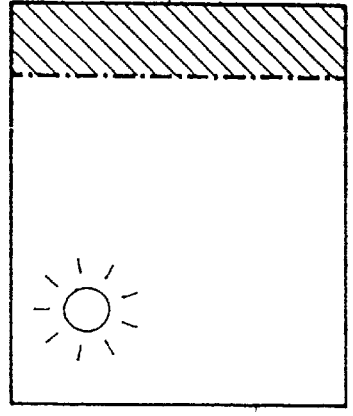
Figure 6C:
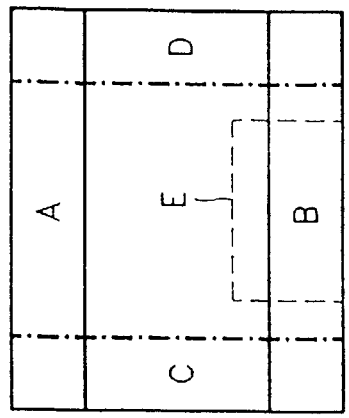
Figure 6E:
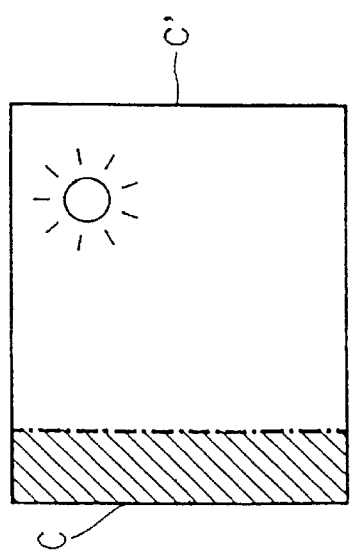

In step 109, as shown in FIG. 6D, a fourth backlight compensation area having an object area D and an illumination area D' is selected, and the level of the luminance signal of the fourth backlight compensation area is read out from CCD 111. In step 110, the value of the luminance signal level of the fourth backlight compensation area is compared with the reference luminance signal level value and the difference is stored in memory 113. In step 111, as shown in FIG. 6E, a fifth backlight compensation area having an object area E and an illumination area E' is selected, and the level of the luminance signal of the fifth backlight compensation area is read out from CCD 111. In step 112, the value of the luminance signal level of the fifth backlight compensation area is compared with the reference luminance signal level and the difference value is stored in memory 113.

In step 113, the backlight compensation area having the least one of the difference values stored in memory 113 is selected under the control of the microcomputer 114. Here, the selected backlight compensation area is displayed as an OSD in step 114. In step 115, an iris driving signal is generated by the iris driving signal generator 116, using the luminance signal level of the object area of the selected backlight compensation area, and the iris driver 117 is driven, thereby performing the backlight compensation function. In step 116, it is determined whether a predetermined period of time has passed. When the predetermined period of time has passed, the procedure goes back to step 103. In step 103, a backlight compensation area is automatically re-selected according to changes in the ambient illumination caused by the passage of time or the movement of the object, thereby performing the backlight compensation function.

Figure 7A:
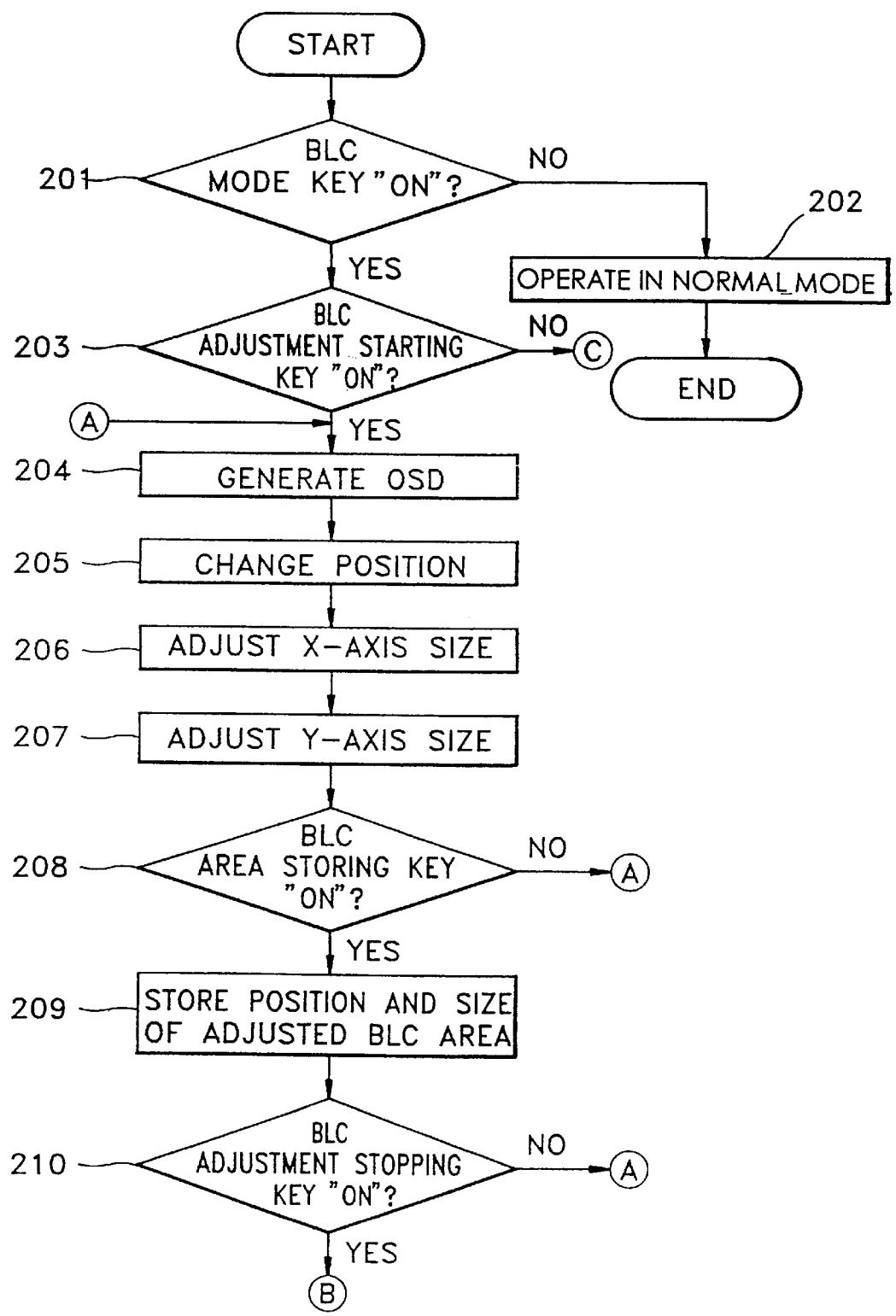
FIGS. 7A and 7B together form a flowchart illustrating the operation of another embodiment of the backlight compensation method constructed according to the principles of the present invention.
Figure 7B:
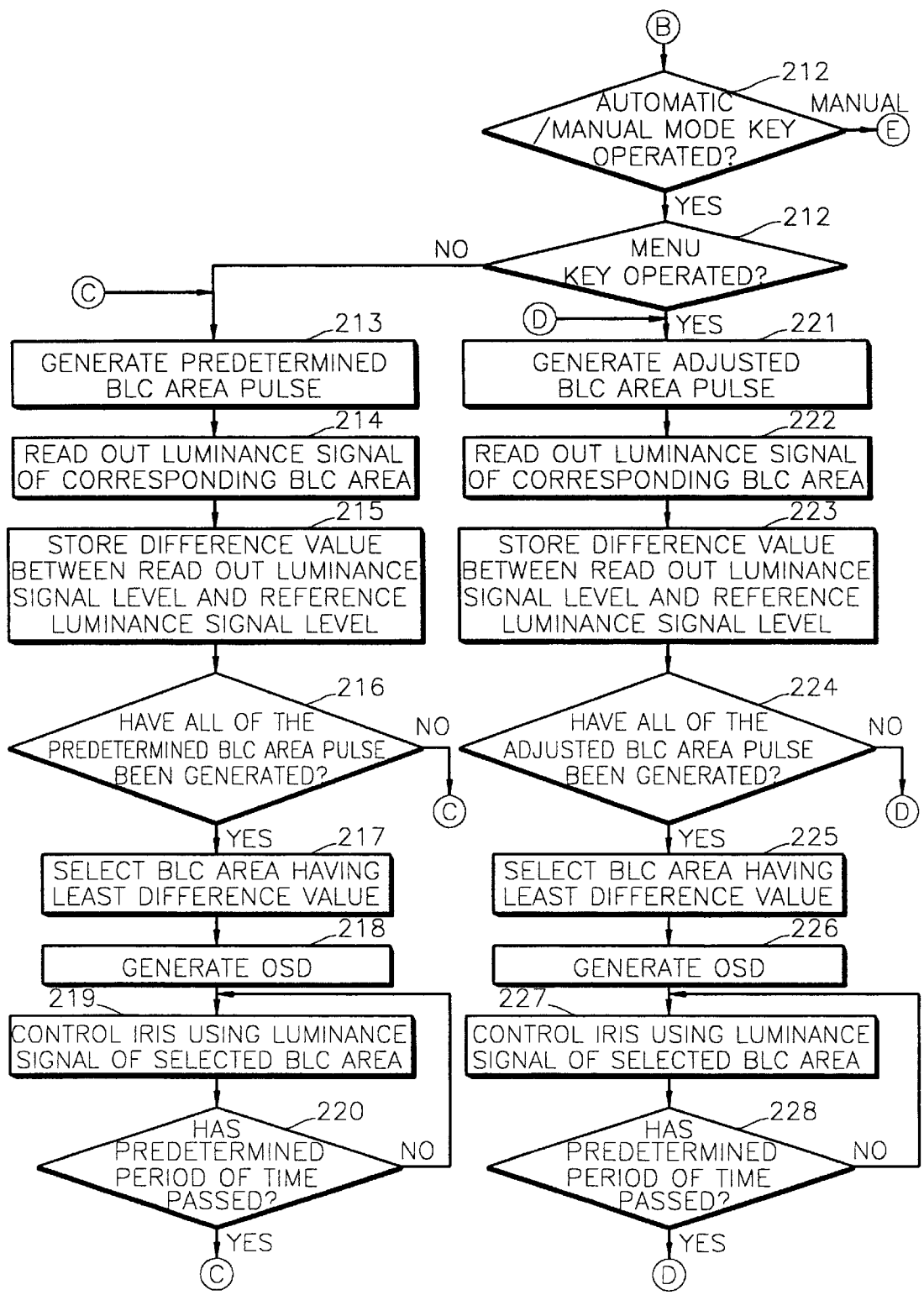
Figure 7C:
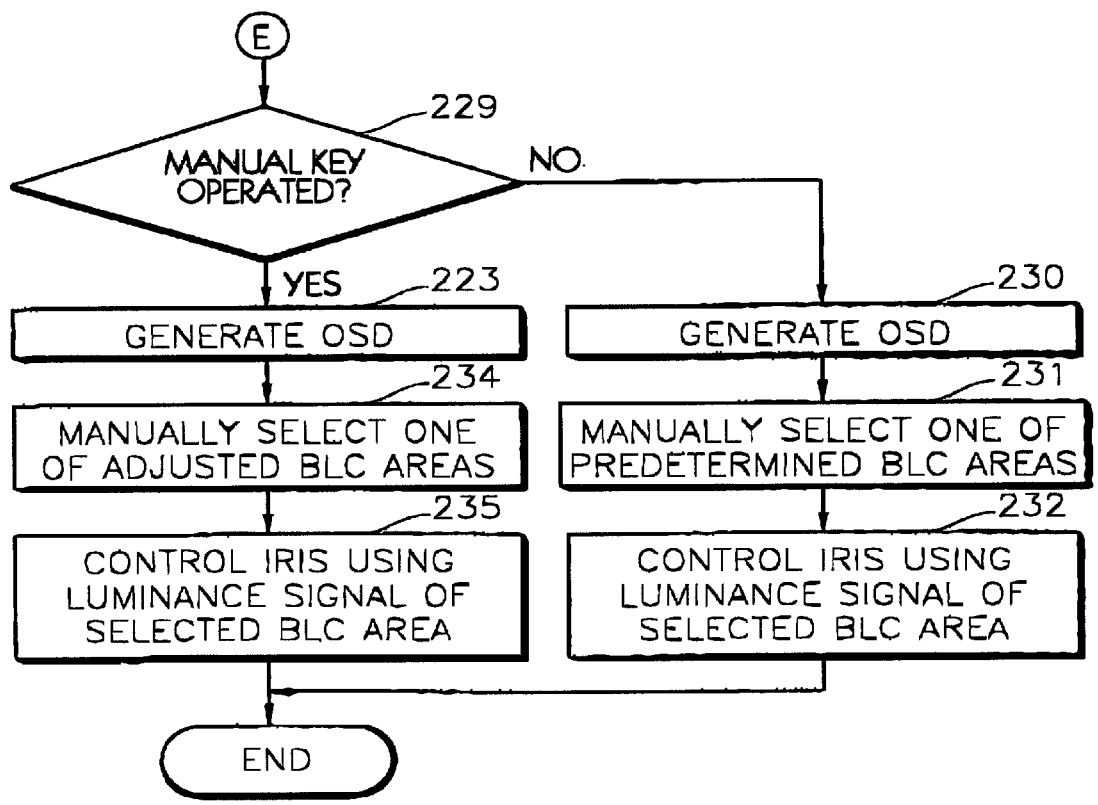

FIGS. 7A and 7B together form a flowchart illustrating the operation of another embodiment of the backlight compensation method according to the present invention. The method will be described referring to FIG. 4 and FIGS. 7A and 7B. In step 201, it is determined whether the backlight compensation mode key 25 of the monitoring camera is "on" or "off". When backlight compensation mode key 25 is "off", the camera operates in a normal mode in step 202. When backlight compensation mode key 25 is "on", it is determined whether the backlight compensation adjustment starting key 21 is "on" or "off" in step 203.

When the backlight compensation adjustment starting key 21 is "off", the procedure jumps to step 213 to determine the state of backlight compensation automatic/manual mode key 26 for the purpose of utilizing backlight compensation areas previously adjusted by a user or predetermined backlight compensation areas without adjusting backlight compensation areas. When backlight compensation adjustment starting key 21 is "on", the procedure proceeds to step 204. In step 204, an OSD is generated so that the user himself can adjust a backlight compensation area in step 205.

In step 205, the position of the backlight compensation area is selected by operating the backlight compensation adjusting control 131 and operating the enter key 24. In step 206, the X-axis size of the backlight compensation area is adjusted by operating the backlight compensation adjusting control 131 and operating the enter key 24. In step 207, the Y-axis size of the backlight compensation area is adjusted by operating the backlight compensation adjusting control 131 and operating enter key 24. In step 208, the backlight compensation area is readjusted by the repeated procedure of returning back to step 204, displaying the adjusted backlight compensation area as an OSD without storing the adjusted backlight compensation area, until the backlight compensation area storing key 23 is determined to be "on". When the backlight compensation area storing key 23 is determined to be "on", the position and size of the adjusted backlight compensation area is stored in the memory 123, in step 209.

The number of adjusted backlight compensation areas is not more than five since there are five backlight compensation-area selecting keys 28–32. When there are less than five, say, three adjusted backlight compensation areas, it may be programmed to select the three adjusted backlight compensation areas by backlight compensation-area selecting keys 28–30 and to select fourth and fifth predetermined backlight compensation areas by backlight compensation-area selecting keys 31 and 32.

In step 210, the state of the backlight compensation adjustment stopping key 22 is determined. When the backlight compensation adjustment stopping key is determined to be "off", the procedure goes back to step 204, a backlight compensation area different from the previously designated backlight compensation areas is designated and stored in the memory 123, while it is displayed as an OSD. As a result, the user can designate and store several backlight compensation areas apart from the backlight compensation areas predetermined during manufacturing, which are suited to the surroundings of the monitoring camera and expected illumination conditions. On the other hand, when the backlight compensation adjustment stopping key 22 is determined to be "on" in step 210, the operation of the backlight compensation automatic/manual mode key 26 is determined in step 211. When an automatic mode is designated by pushing backlight compensation automatic/manual mode key 26 once, a determination made of whether menu key 27 has been operated in step 212. When menu key 27 has not been operated, the pulse of a predetermined backlight compensation area is generated by the backlight compensation area pulse generator 125 in step 213.

When the respective backlight compensation area pulses corresponding to the first backlight compensation area through the fifth backlight compensation area, as are respectively shown in FIGS. 6A through 6E, are sequentially generated, in step 213, the respective luminance signal levels of the backlight compensation areas corresponding to the generated backlight compensation area pluses are read from CCD 121, in step 214. In step 215, the values of the luminance signal levels of the read-out backlight compensation areas are compared with the reference luminance signal level values, and the difference values are stored in corresponding backlight compensation areas of memory 123.

In step 216, it is determined whether the five backlight compensation area pulses have all been generated. If all the pulses have not been generated, the procedure goes back to step 213, while if all the pulses have been generated, the backlight compensation area having the least one of the difference values stored in the memory 123 is selected under the control of the microcomputer 124, in step 217. In step 218, an OSD corresponding to the selected backlight compensation area is generated. In step 219, an iris driving signal is generated by the iris driving signal generator 126, using the data of the luminance signal of the object area in the selected backlight compensation area, and the iris driver 127 is driven, thereby performing the backlight compensation function.

In step 220, the procedure regularly feeds back at predetermined intervals, and the backlight compensation area having the least of the difference values between the luminance signal levels and the reference luminance signal levels of the five predetermined backlight compensation areas is redesignated, for the purpose of backlight compensation suitable to changes in ambient illumination caused by the passage of time and the movement of the object, thereby performing the most appropriate backlight compensation.

When menu key 27 is operated in the backlight compensation automatic mode, a pulse corresponding to a backlight compensation area adjusted by a user is generated in step 221. In step 222, the luminance signal level of the adjusted backlight compensation area is read out from CCD 121. In step 223, the luminance signal level value and the reference luminance signal level value of the read-out backlight compensation area are compared and the difference value is stored in memory 123.

In step 224, it is determined whether all of the backlight compensation area pulses corresponding to the adjusted backlight compensation areas have been generated. If all the pulses have not been generated, the procedure goes back to step 221, while if all the pulses have been generated, the adjusted backlight compensation area having the least of the difference values stored in the memory 123 is selected under the control of the microcomputer 124, in step 225. In step 226, an OSD corresponding to the backlight compensation area selected from among the adjusted backlight compensation areas is generated.

In step 227, an iris driving signal is generated by iris driving signal generator 126, using the data of the luminance signal of the object area of the selected backlight compensation area, and the iris driver 127 is driven, thereby performing the backlight compensation function.

In step 228, the procedure feeds back regularly at predetermined time intervals, and a backlight compensation area is redesignated having the least of the difference values between the luminance signal levels and the reference luminance signal levels of the adjusted backlight compensation areas for the purpose of backlight compensation suitable to changes in the ambient illumination caused by the passage of time or the movement of the object, thereby performing the most appropriate backlight compensation.

In step 211, a manual mode is designated by pushing the backlight compensation automatic/manual mode key 26 twice. In step 229, a determination is made of whether menu key 27 have been operated in the backlight compensation manual mode. If it has been determined that there has been no operation of the menu key 27, OSDs corresponding to the five predetermined backlight compensation areas are generated in step 230.

In step 231, a backlight compensation area of the backlight compensation areas displayed as OSDS is selected by operating one of the backlight compensation area manual selecting keys 28–32. In step 232, the iris is driven, using the luminance signal level of the selected backlight compensation area, thereby backlight compensating. In step 229, it is determined whether there the menu key 27 has been operated in the designated backlight compensation manual mode. If the menu key 27 has been operated, OSDs corresponding to backlight compensation areas designated by the user are generated in step 233. In step 234, one of the adjusted backlight compensation areas is manually selected. In step 235, the iris is driven, using the luminance signal level of the selected backlight compensation area, to provide backlight compensation.

Meanwhile, if the automatic mode has been designated in step 211 shown in FIG. 7B, without menu key 27 being operated, step 221 through step 228 may be performed for automatically performing the backlight compensation function by selecting the most appropriate backlight compensation area for changes in illumination and the movement of the object from among the adjusted backlight compensation areas, while if the manual mode is designated, steps 233, 234 and 235 may be performed so that the user selects one of the adjusted backlight compensation areas.

The present invention can be used for a camcoder for home use, a video camera and the like, as well as a CCTV system.

As described above, the present invention exhibits the advantage that a stable backlight compensation can be performed without any need for manual redesignation of backlight compensation areas despite changes in ambient illumination, since the most appropriate backlight compensation area for the ambient illumination is automatically selected from among designated backlight compensation areas, and the iris is driven on the basis of the luminance signal level of the selected backlight compensation area, to thereby backlight compensate.

Another advantage is that the most appropriate backlight compensation function is provided by storing backlight compensation areas suited to the surroundings of the monitoring camera whose sizes and positions are adjusted by a user, as well as predetermined backlight compensation areas, automatically or manually selecting one of the stored backlight compensation areas, and controlling the iris according to the luminance signal level of the selected backlight compensation area.

What is claimed is:

1. A backlight compensation method in a camera, comprising the steps of:
    forming in an image input stage of a camera, a visual image of a scene comprised of a plurality of backlight compensation areas;
    reading from said image input stage, values indicative of luminance signal levels within each of said areas;
    detecting luminance signal levels for a plurality of predetermined backlight compensation areas;
    calculating the difference values between said detected luminance signal levels and reference luminance signal levels;
    selecting a backlight compensation area having the least of said calculated difference values;
    controlling an iris of the camera in accordance with the luminance signal level of said selected backlight compensation area; and
    automatically redesignating said backlight compensation areas in accordance with changes in illumination due to the passage of time and the movement of the object by again detecting said luminance signal levels, calculating said difference values, selecting said backlight compensation area, and controlling said iris predetermined period of time after said controlling said iris of the camera in accordance with said detected luminance signals levels.

2. A backlight compensation method of claim 1, wherein said luminance signal levels are determined by:
    generating backlight compensation-area pulses corresponding to said plurality of predetermined backlight compensation areas, and providing said backlight compensation-area pulses to said image input means; and
    reading the luminance signal levels of areas corresponding to said backlight compensation-area pulses from said image input means.

3. A backlight compensation method of claim 1, comprised of controlling said luminance signal level, said selected backlight compensation area by controlling a driving pulse for driving said image input means while controlling said iris.

4. A backlight compensation method of claim 1, comprised of selecting said backlight compensation area having said least of said calculated difference values by displaying said selected backlight compensation area as an on screen display.

5. A backlight compensation method for a camera, comprising the steps of:
    forming in an image input stage of a camera, a visual image of a scene comprised of a plurality of backlight compensation areas;
    reading from said image input stage, values indicative of luminance signal levels within each of said areas;
    determining whether a backlight compensation-area adjustment key has been operated;
    generating adjusted areas by adjusting the positions and sizes of said backlight compensation areas when said backlight compensation-area adjustment key has been operated;
    determining whether an automatic/manual backlight compensation mode keys been operated when said backlight compensation-area adjustment key has not been operated;
    detecting said luminance signal levels of said adjusted areas when an automatic backlight compensation mode key has been operated;
    calculating difference values between said detected luminance signal levels and reference luminance levels;
    selecting a backlight compensation area corresponding to the least of said calculated difference values;
    controlling an iris conveying said visual image to the camera in accordance with the luminance signal level of said backlight compensation area selected;
    automatically redesignating said adjusted in accordance with changes in illumination due to the passage of time and the movement of an object within said visual image by again detecting said luminance signal level of said adjusted areas after a predetermined period of time after performing said controlling of said iris; and alternatively manually selecting one of said adjusted backlight compensation areas when a manual backlight compensation mode key has been operated instead of said automatic backlight compensation mode key; and controlling said iris in accordance with the luminance signal level corresponding to said backlight compensation area selected.

6. A backlight compensation method as claimed in claim 5, comprised of detecting said luminance signal levels by:

generating backlight compensation-area pulses corresponding to said adjusted areas adjusted and providing said backlight compensation-area pulses to said image input means; and reading the luminance signal levels of areas corresponding to said generated backlight compensation-area pulses from said image input means.

7. A backlight compensation method as claimed in claim 5, comprised of controlling said luminance signal level of said selected backlight compensation area by controlling a driving pulse for driving said image input means while controlling said iris.

8. A backlight compensation method as claimed in claim 5, comprised of displaying said selected backlight compensation area as an on screen display while selecting said backlight compensation area.

9. A backlight compensation method as claimed in claim 5, comprised of displaying said adjusted backlight compensation areas as an on screen display while controlling said iris in accordance with said luminance signal level corresponding to said backlight compensation area selected.

10. A backlight compensation method in a camera for selecting the most appropriate backlight compensation area according to the movement of an object or changes in illumination, from among a plurality of backlight compensation areas and controlling the level of the luminance signal, which is read out from an image input means, of the selected backlight compensation area, the method comprising the steps of:

(a") adjusting the positions and sizes of said backlight compensation areas by operating a backlight compensation-area adjustment key;

(b") detecting the luminance signal levels of a plurality of predetermined backlight compensation areas when a mode for selecting a predetermined backlight compensation area in a backlight compensation automatic mode is designated by an operation of a key;

(c") calculating the difference values between said luminance signal levels detected in step (b") and reference luminance signal levels;

(d") selecting a backlight compensation area having the least of said difference values calculated in step (c");

(e") controlling an iris according to the luminance signal level of said backlight compensation area selected in step (d");

(f") automatically redesignating a backlight compensation area according to changes in illumination due to the passage of time and the movement of the object by returning to step (b") a predetermined period time after performing step (e");

(g") detecting the luminance signal levels of said backlight compensation areas adjusted in step (a") when a mode for selecting an adjusted backlight compensation area in the backlight compensation automatic mode is designated by an operation of a key instead of said predetermined backlight compensation are;

(h") calculating the difference values between said luminance signal levels detected in step (g") and reference luminance signal levels;

(i") selecting a backlight compensation area having the least of said difference values calculated in step (h");

(j") controlling said iris according to the luminance signal level of said backlight compensation area selected in step (I");

(k") automatically redesignating a backlight compensation area according to changes in illumination due to the passage of time and the movement of the object by returning to step (g") a predetermined period of time after performing step (j");

(l") alternatively manually selecting one of said predetermined backlight compensation areas when a mode for selecting a predetermined backlight compensation area in a backlight compensation manual mode is designated by an operation of a key instead of said backlight compensation automatic mode;

(m") controlling said iris according to the luminance signal level of said backlight compensation area selected in step (l");

(n") alternatively manually selecting one of said adjusted backlight compensation areas when a mode for selecting an adjusted backlight compensation area in the backlight compensation manual mode is designated by an operation of a key instead of said backlight compensation automatic mode; and (o") controlling said iris according to the luminance signal level of said backlight compensation area selected in step (n").

11. A backlight compensation method as claimed in claim 10, wherein step (b") comprises the steps of:

(b1) generating backlight compensation-area pulses corresponding to said plurality of predetermined backlight compensation areas and providing said backlight compensation area pulse to said image input means; and (b2) reading out the luminance signal levels of backlight compensation areas corresponding to said backlight compensation-area pulses.

12. A backlight compensation method as claimed in claim 10, wherein step (g") comprises the steps of:

(g1) generating backlight compensation-area pulses corresponding to said backlight compensation areas adjusted in said step (a") and providing said backlight compensation-area pulses to said image input means; and (g2) reading out the luminance signal levels of areas corresponding to said generated backlight compensation-area pulses from said image input means.

13. A backlight compensation method as claimed in claim 10, wherein each of the luminance signal levels of said selected backlight compensation areas each is controlled by controlling a driving pulse for driving said image input means in steps (e"), (j"), (m") and (o").

14. A backlight compensation method as claimed in claim 10, wherein each of steps (d") and (I")comprises the step of displaying said selected backlight compensation areas as on screen displays.

15. A backlight compensation method as claimed in claim 10, wherein step (i") comprises the step of displaying said predetermined backlight compensation area as an on screen display in step (i").

16. A backlight compensation method as claimed in claim 10, wherein step (n") comprises the step of displaying said adjusted backlight compensation area as an on screen display in step (n").

17. A backlight compensation apparatus, comprising:

image input means having registers driven by driving pulses and corresponding to displays thereof, for converting optical information of an object into an electrical signal;

detecting means for detecting a luminance signal from said electrical signal;

a memory storing positional information of a plurality of predetermined backlight compensation areas and reference luminance signal level values of corresponding backlight compensation areas;

a microcomputer for generating area control signals according to the positional information of the backlight compensation areas stored in said memory by recognizing an automatic backlight compensation mode designation key input, and selecting a backlight compensation area having the least of the difference values between the reference luminance signal levels stored in said memory and the luminance signal levels detected by said detecting means;

area pulse generating means for generating backlight compensation-area pulses corresponding to said plurality of predetermined backlight compensation area according to said area control signals and outputting said backlight compensation-area pulses to said image input means; and level controlling means for controlling the luminance signal level of said selected backlight compensation area to be a predetermined level.

18. A backlight compensation apparatus as claimed in claim 17, further comprising an on screen display generating means for displaying said backlight compensation area selected under the control of said microcomputer as an on screen display.

19. A backlight compensation apparatus as claimed in claim 17, wherein said level controlling means comprises:

generating means for generating an iris driving signal according to the luminance signal level of said selected backlight compensation area; and controlling means for controlling the opening of an iris according to said iris driving signal.

20. A backlight compensation apparatus as claimed in claim 17, wherein said level controlling means further comprises a luminance controlling means for controlling the luminance signal level of said selected backlight compensation area by controlling said driving pulse for driving said image input means.

21. A backlight compensation as claimed in claim 20, wherein said image input means comprises a charge coupled device.

22. A backlight compensation as claimed in claim 17, wherein said image input means comprises a charge coupled device.

23. A backlight compensation apparatus, comprising:

an image input means comprised of registers driven by a driving pulse and corresponding to displays thereof, for converting optical information of an object into an electrical signal;

detecting means for detecting a luminance signal from said electrical signal;

backlight compensation area adjusting means for adjusting the positions and sizes of backlight compensation areas;

a memory storing positional information of a plurality of predetermined backlight compensation areas, reference luminance signal level values of corresponding backlight compensation areas, and the positional information and reference luminance signal level values of said backlight compensation areas adjusted by said backlight compensation-area adjusting means;

key inputting means comprising a key for commanding storage of the positions and sizes of said backlight compensation areas adjusted by said backlight compensation area adjusting means, a key for designating one of an automatic mode and a manual mode, a menu key for controlling the reading-out of the positional information and reference luminance signal levels of one of said predetermined backlight compensation areas stored in said memory and said adjusted backlight compensation areas stored in said memory, and selecting keys for manually selecting said predetermined backlight compensation areas;

a microcomputer generating area control signals corresponding to said positional information, calculating the difference values between the reference luminance signal levels of said predetermined backlight compensation areas and said detected luminance signal levels according to the input of said automatic backlight compensation mode designation key and said menu key and selecting a predetermined backlight compensation area having the least difference value, calculating the difference values between the reference luminance signal levels of said adjusted backlight compensation areas and said detected luminance signal levels, and selecting an adjusted backlight compensation area having the least difference value;

area pulse generating means for generating backlight compensation-area pulses corresponding to said predetermined backlight compensation areas and said adjusted backlight compensation areas according to said area control signals and outputting said backlight compensation area pulses to said image input means; and level controlling means for controlling the luminance signal level of a backlight compensation area selected under the control of said microcomputer and a backlight compensation area selected by a manual mode key and a selecting key.

24. A backlight compensation apparatus as claimed in claim 23, further comprising an on screen display generating means for displaying the positions and sizes of said backlight compensation areas adjusted by said backlight compensation area adjusting means as on screen displays, and displaying said adjusted backlight compensation areas and said predetermined backlight compensation areas as on screen displays.

25. A backlight compensation apparatus as claimed in claim 23, wherein said level controlling means comprises:

generating means for generating an iris driving signal according to the luminance signal level of a selected backlight compensation area; and controlling means for controlling the opening of an iris according to said iris driving signal.

26. A backlight compensation apparatus as claimed in claim 23, wherein said level controlling means further comprises a luminance controlling means for controlling the luminance signal level of the selected backlight compensation area by controlling the driving pulse for driving said image input means.

27. A backlight compensation as claimed 26, wherein said image input means comprises a charge coupled device.

28. A backlight compensation apparatus as claimed in claim 23, wherein said backlight compensation area adjusting means comprises:

an adjusting control for adjusting the position and the X- and Y-axis sizes of a backlight compensation area; and an analog to digital converter for converting the position and X- and Y-axis sizes input by said adjusting control into a digital signal and for outputting said digital signal to said microcomputer.

29. A backlight compensation as claimed in claim 23, wherein said image input means comprises a charge coupled device.

* * * * *